United States Patent
Bezen et al.

(10) Patent No.: US 12,549,512 B2
(45) Date of Patent: Feb. 10, 2026

(54) DATA PLANE SEPARATION IN NETWORKS TO REUSE VIRTUAL NETWORK ADDRESSES

(71) Applicant: MELLANOX TECHNOLOGIES, LTD., Yokneam (IL)

(72) Inventors: Lior Hodaya Bezen, Tel Aviv (IL); Alex Netes, Rehovot (IL); Idan Seider, Haifa (IL); Lion Levi, Yavne (IL); Glenn Dearth, Groton, MA (US); Nitin Hande, Sunnyvale, CA (US); Mark Hummel, Franklin, MA (US)

(73) Assignee: Mellanox Technologies, Ltd., Yokenam (IL)

( * ) Notice: Subject to any disclaimer, the term of this patent is extended or adjusted under 35 U.S.C. 154(b) by 11 days.

(21) Appl. No.: 18/382,810

(22) Filed: Oct. 23, 2023

(65) Prior Publication Data
US 2025/0133058 A1     Apr. 24, 2025

(51) Int. Cl.
*H04L 61/5038*     (2022.01)
*H04L 101/668*     (2022.01)

(52) U.S. Cl.
CPC .... *H04L 61/5038* (2022.05); *H04L 2101/668* (2022.05)

(58) Field of Classification Search
CPC .............. H04L 61/5038; H04L 2101/668
USPC ................................................ 709/245
See application file for complete search history.

(56) References Cited

U.S. PATENT DOCUMENTS

| | | | | |
|---|---|---|---|---|
| 2013/0329547 A1* | 12/2013 | Takase | ............... | H04L 41/0654 370/220 |
| 2017/0149888 A1* | 5/2017 | Tasoulas | ............... | H04L 49/70 |
| 2020/0007383 A1* | 1/2020 | Efraim | ............... | H04L 49/30 |

* cited by examiner

*Primary Examiner* — Glenford J Madamba
(74) *Attorney, Agent, or Firm* — Hogan Lovells US LLP

(57) ABSTRACT

Systems and methods herein are for one or more processing units that can communicate in a network using a subnet manager (SM) that includes a mapping of one virtual network address to two or more physical ports, where the one virtual network address may be associated with different switches of different data planes, and where data may be communicated concurrently and separately using the one virtual network address and using the two or more physical ports.

20 Claims, 11 Drawing Sheets

DATA PLANE SEPARATION IN NETWORKS TO REUSE VIRTUAL NETWORK ADDRESSES

TECHNICAL FIELD

At least one embodiment pertains to data plane separation in networks to reuse virtual network addresses.

BACKGROUND

InfiniBand® (IB) networks may be used in high-performance computing and data centers. IB networks may be a switched fabric network that uses a high-bandwidth and low-latency communication protocol referred to as Remote Direct Memory Access (RDMA) to allow devices to communicate directly without a host. This allows for very fast communication speeds and low latency, making it well-suited for applications that require high-speed data transfer and low-latency communication, such as financial trading systems, high-performance computing, and other time-sensitive applications. In IB networks, communication occurs using a series of interconnected switches, which are responsible for routing data packets between devices. Distinct identifiers used to identify IB ports can limit a number host machines able to communicate on an IB network but also require assignment of the identifier by a number of endpoints or a number of ports per endpoint.

DETAILED DESCRIPTION

Figure 1:
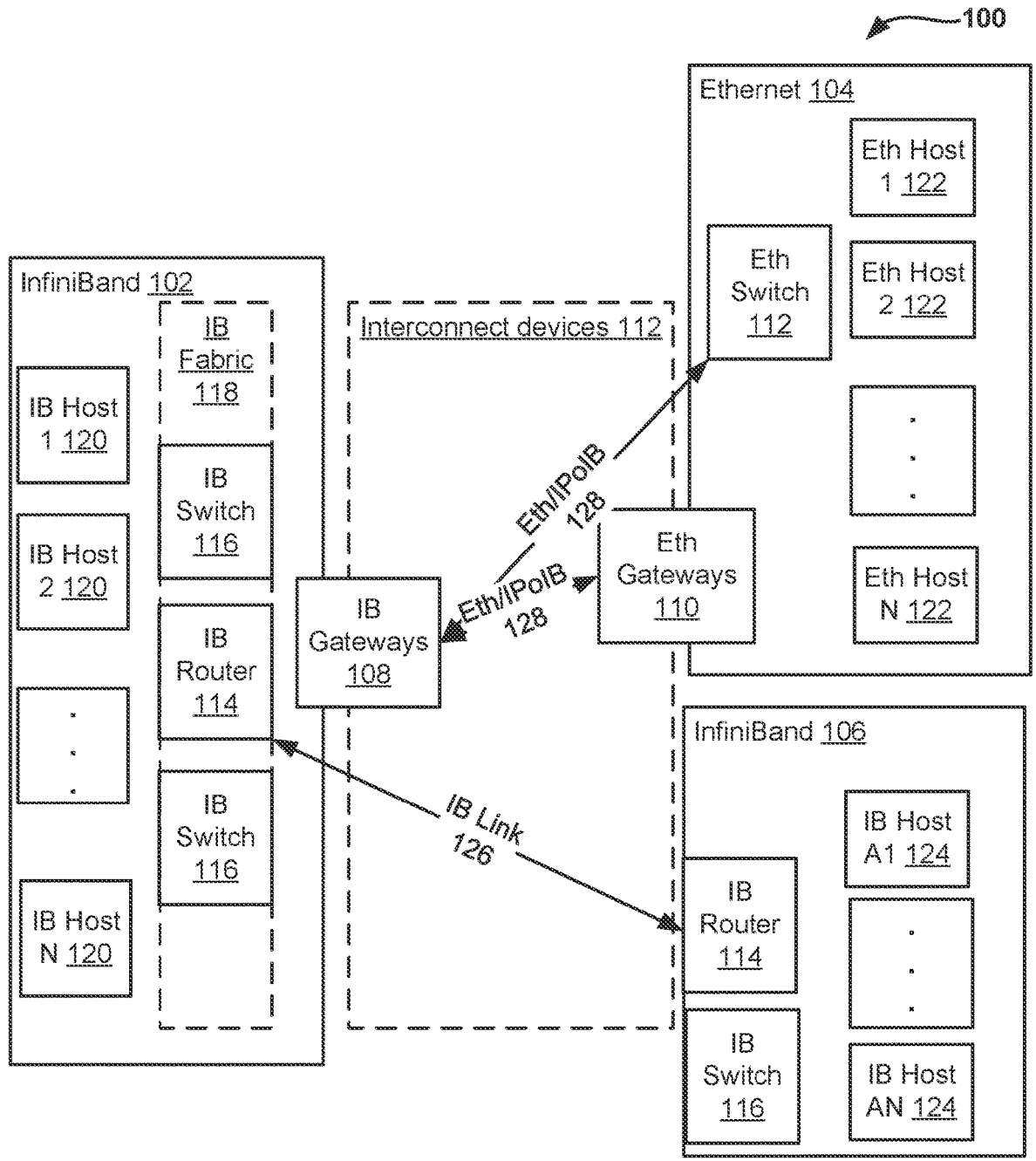
FIG. 1 illustrates a system that is subject to data plane separation in networks to reuse virtual network addresses, according to at least one embodiment.

In at least one embodiment, FIG. 1 illustrates a system 100 that is subject to data plane separation in networks to reuse virtual network addresses. Further, local port grouping for rails of network links in IB networks may be supported using the reused virtual network addresses, as detailed herein. A local port is used interchangeably with a physical port herein. The system 100 enables a data plane separation in networks to reuse virtual network addresses (such as local identifiers or LIDs) for different physical ports of a host machine. The different physical ports are associated with different switches of different data planes so that traffic of the host machine can be communicated concurrently and separately using the different physical ports that is addressed using a same virtual network address, for instance; and so that the same virtual network address can be reused in the different switches.

In at least one embodiment, a system 100 also enables virtual data plane separation in networks to reuse virtual network addresses. For example, instead of data plane separation that may include physical separation (such as, using different switches), logical or virtual data plane separation may be enabled, in part by rail optimization, in which a switch can be divided into "virtual switches" with a logical separation that is implemented by forwarding logic and without a need for physical separation. Therefore, as used herein, data plane separation may be physical or virtual. In either case, data plane separation may be enabled by a subnet manager (SM) that includes a mapping of one virtual network address to two or more physical ports on a host machine. In addition, local port grouping may be provided, as an abstraction, that is referred to herein as rails of network links between such local port groups in two host machines to a single virtual network address, to provide the logical or virtual data plane separation. The network links can exclusively use the physical ports that are grouped together for IB communication between the host machines.

In at least one embodiment, in a planarized network (such as, NVLINK® or IB), a physical separation can be enabled throughout a network fabric, such as, between physical ports of different data planes. Each of the different data planes may be associated with a different switch. In at least one embodiment, data plane separation in networks to reuse virtual network addresses may be performed by associating a single LID for the physical ports but having the ports associated to the different switches. This can be supported further by the planarized nature that is enabled for NVLINK or related types of networks. As a result, the data plane separation allows reusing port LIDs over the different data planes by a subnet manager (SM) that performs the association between physical ports and virtual network address. In at least one embodiment, the association is stored in the SM as a mapping of the association. The SM can provide requisite configuration information to the different switches to allow communication from the host to occur concurrently and separately using the single LID and using the different physical ports. For example, a plane and LID combination can uniquely identify a physical port using the data plane separation to reuse virtual network addresses.

Such data plane separation in networks to reuse virtual network addresses can address limited assignment of LIDs in NVLINK or related types of networks, where the assignment may occur by a number of endpoints or a number of ports per endpoint. As a result of having to assign the LIDs by the number of endpoints or number of ports per endpoint, scaling of a single subnet may be limited. The limit may be partly as a result of the LIDs-space that may include only 48,000 (or 48K) LIDs used for unicast forwarding. Further, the limit may be partly as a result of a switch's capacity for forwarding data having a base size that may be less than 48K. In addition, in multi-port endpoints, a number of hosts in a single subnet may be limited by the LIDs-space capacity (such as, a limitation to 1 or 2 hosts), based in part on a number of ports per end-point.

The solution herein to provide data plane separation in networks to reuse virtual network addresses reduces a number of port LIDs that would have otherwise been required in NVLINK or IB networks. As such, the assignment of LIDs occurs to a number of ports per data plane instead of a number of endpoints or a number of ports per endpoint. A further benefit is that a larger number of LIDs can be assigned using the different data planes for the different switches. In addition to using separate data planes, grouping of local ports can provide rails of network links is an abstraction, along with addressing provided for such local ports. This is in order to control a forwarding of IB communication in larger granularity for IB networks. A benefit realized using the rails of network links with the data plane separation is a reduction of a number of overall LIDs used in an IB network. The reduction of the number of overall LIDs allows for connections between more hosts, as well as creates efficient forwarding schemes for IB switches (such as, by reducing hash bits required for IB communication between two host machines because of the local ports reduced by the rails of abstracted network links).

In FIG. 1, multiple IB host machines 1-N 120, A1-AN 124 of different IB networks 102, 106 may interface with each other using IB switches 116 and IB routers 114; but may also support interfacing between an IB network 102; 106 and an Ethernet network 104 using interconnect devices 112. For an Ethernet network 104, an Ethernet switch 112, and Ethernet gateways 110, may coordinate connectivity within the Ethernet network 104 and may coordinate connectivity between different Ethernet host machines 122 of the Ethernet network 104 and other networks, such as an IB network 102; 106 using Ethernet-over-IB protocols 128. Differently, in an IB network 102; 106, each subnet 102, 106 relies on a subnet manager (SM) and subnet management agents (SMAs) to coordinate network connectivity among different IB host machines 1-N 120; A1-AN 124 that communicate using IB links 128. Further, the SM may be implemented on an IB switch 116 or on at least one of the IB host machine 1-N 120; A1-AN 124, where at least one SM is provided in each subnet 102; 106.

In one example, because an IB network 102 includes SMs and SMAs, such as illustrated and/or discussed with respect to at least FIGS. 2A-4, these aspects are used to monitor link states of IB ports within IB hosts 1-N 120, A1-AN 124. Further, an SM 220 (in FIGS. 2A, 2B) is used to configure internal forwarding tables of an IB switch 116 via an SMA 302 (in FIG. 3). As such, when establishing a mapping of virtual LIDs and establishing a relationship between the virtual LIDs, the SM must be notified so that it can configure one or more IB switches 116 using the mapping and the relationship that are part of a rail-based forwarding table. An IB switch routes IB packets from one IB link to another IB link in a same IB subnet, such as within each of IB subnets 1 252; 2 254 in FIG. 2B. An IB router can route packets between the IB subnets 1 252, 2 254 in FIG. 2B.

Figure 2A:
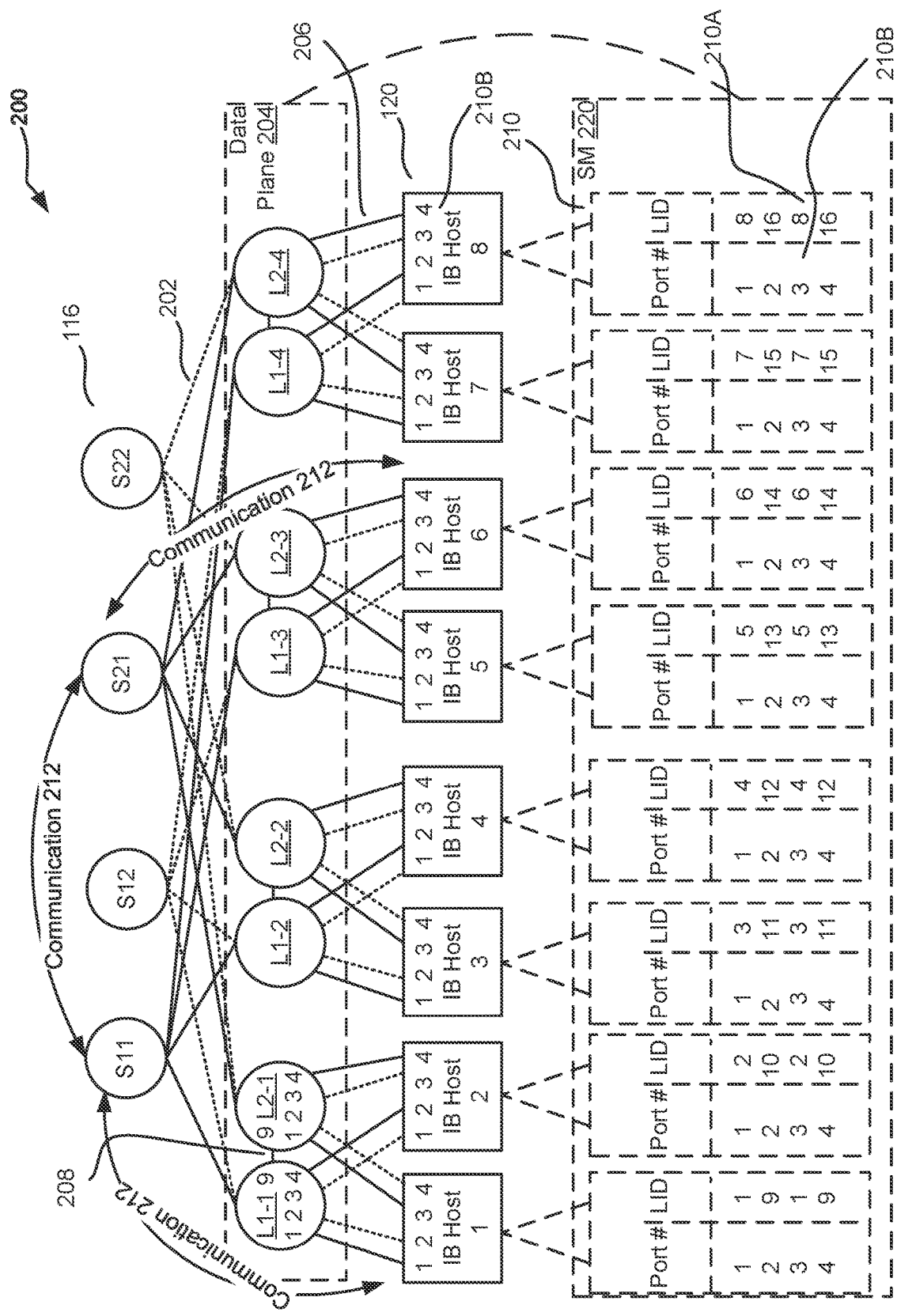
FIG. 2A illustrates aspects of data plane separation in networks to reuse virtual network addresses for multiple hosts, according to at least one embodiment.

FIG. 2A illustrates aspects of data plane separation 200 in networks to reuse virtual network addresses for multiple hosts, according to at least one embodiment. At least two data plane L1 and L2 204 are illustrated. Further, while illustrated as distinct entities these may be physically enabled using different ones of the IB switches S11-S22 116 or these may be virtually enabled within a subnet manager (SM) 220 of a subnet that may include the IB hosts 1-8 120; 1-8 124. In at least one embodiment, the SM 220 may be an abstraction performed by one or more of the IB switches S11-S22 116.

As illustrated, a system for communication 212 in a network 102; 106 (such as, an IB or other supported network) may include the SM 220 that has, stored within it, a mapping 210 of one virtual network address 210A (such as, one of the illustrated LIDs 1-16) to two or more physical ports 210B (such as, ports 1-4) on an IB host machine 120; 124 (such as, host machines 1-8 that may be IB or any other supported host machines). The one virtual network address 210A may be associated with different IB switches 116 of different data planes 204. For example, one data plane L1 may be associated with switches S11 and S12, while a second data plane L2 may be associated with switches S21 and S22. Further, data associated with the IB host machine 1-8 120; 1-8 124 may be communicated concurrently and separately using the one virtual network address 210A and using the two or more physical ports 210B. For example, as the data planes 204 are distinct, the communication using the same LIDs 210A are enabled to not interact or cross for two different physical ports 210B.

In at least one embodiment, the different data planes L1-L2 204 provides physical separation for traffic associated with the two or more physical ports 210B of the IB hosts 1-8 120; 1-8 124. As illustrated in FIG. 2A, ports 1 and 3 of host 1 are both provided with an example LID of 1 as these ports are associated with different data planes, such as port 1 of host 1 being associated data plane L1-1 and port 3 of host 1 being associated with data plane L2-1. As explained previously, the data planes 204 may be an abstraction that is defined by the association in a mapping 210 provided in at least one SM 220. The lines 206 illustrate, in part, the mapping between physical ports 210B to different data planes L1-1-L2-4 204 (and their underlying virtual network addresses 210A), whereas the lines 202 above the data planes 204 illustrate, in part, the distribution of the IB switches S11-S22 116 to the different data planes L1-1-L2-4 204

In at least one embodiment, the SM 220 is further to determine connected devices in the network. For example, the SM 220 may perform a sweep of all connected devices in its subnet. Then, the SM 220 may determine if there are more physical ports discovered than available virtual network addresses. To the extent that may be the case, the SM 220 can enable or register the physical ports as part of different data planes 204 using mappings of two or more physical ports for at least individual hosts to same virtual network addresses, but under different data planes. Therefore, the SM 220 can determine that the one virtual network address is associated with a first physical port of the two or more physical ports on the host machine, such as host 1, and can determine that the one virtual network address is also associated with a first one of the different switches S11. Further, the SM 220 can assign the one virtual network address to a second physical port of the two or more physical ports on the host 1 and to a second one of the different switches S21.

In at least one embodiment, the SM 220 is further to allow reuse of the one virtual network address for the different data planes 204 by updating the mapping 210 to associate the one virtual network address to different ones of the two or more physical ports on the IB host machine 1-8 120; 1-8 124. This information of the update to the mapping 210 is also provided to the different IB switches S11-S22 116 of the different data planes 204. In at least one embodiment, the SM 220 is further to use a combination of one of the different data planes 204 and the one virtual network address 210B to uniquely identify one of the two or more physical ports 210A on an IB host 1-8 120; 1-8 124 for traffic or communication 212 through the different IB switches S11-S22 116.

In at least one embodiment, the SM 220 provides configuration information to the different IB switches S11-S22 116 to enable the communication 212. For example, the SM 220 can provide first configuration information to a first switch S11 of the different switches to identify the one virtual network address, such as LID 1, and to identify a first one of the two or more physical ports, such as Port #1, on the host. The SM 220 can also provide second configuration information to a second switch S21 of the different switches to identify the one virtual network address (LID 1) and a second one of the two or more physical ports, such as Port #3, on the host. The first and second configuration information then allows the switches S1, S21 to use the same virtual network address (LID 1) to ensure concurrent and separate communication 212 for the different physical ports (Ports #1, 3).

In at least one embodiment, the SM 220 is further to determine that a first number of physical ports 210B on connected host machines 120; 124 in the network 100 exceed a second number associated with available virtual network addresses. For example, there may be limited assignment of LIDs in NVLINK or related types of networks, where the assignment may occur by a number of endpoints or a number of ports 210B, per endpoint. As a result of having to assign the LIDs 210A by the number of endpoints or number of ports per endpoint, scaling of a single subnet would have been limited, such as to a LIDs-space that may include only 48,000 (or 48K) LIDs used for unicast forwarding or such as to a limit that may be partly based on a switch's capacity for forwarding data, which may be at a base size that is less than 48K. Then, a number of less than 48K may represent one example of the second number associated with available virtual network addresses. However, on making such a determination regarding availability of the virtual network addresses as against discovered ports in a network, the SM 220 can prepare different data planes 204 for an assignment. The SM 220 can enable the available virtual network addresses 210A to be assigned, as part of the assignment, to the number of physical ports 210B based at least on the different data planes, such as, L1, L2, available in the network.

In at least one embodiment, therefore, a system for communication 212 in a network 100 may include at least one of the IB switches S11-S22 116 that may be part of a first data plane and a second data plane. At least one of the switches can receive configuration information from the SM 220. The configuration information may be associated with a mapping 210 in the SM 220 and can enable the at least one switch to communicate with a further switch of the second data plane in a concurrent and separate manner. Communication 212 between such switches may be on behalf of an IB host machine 1-8 120. Further, the at least one switch (such as, a switch S11) and the further switch (such as, a switch S21) can use one virtual network address (such as, LID 1) that is associated with two or more physical ports (such as Ports #1 and 3) of the IB host machine 1-8 120.

The SM 220 is further to receive a request for the communication 212 from the host machine (such as, host 1). The request may specify a receiver host machine (such as, host 6). The SM 220 is further to associate the one virtual network address LID 1 with a first one (Port #1) of the two or more physical ports of the host machine 1 and with the first data plane L1. The one virtual network address LID 1 may be associated with a second one (Port #3) of the two or more physical ports of the host machine 1 and with the second data plane L1 to enable the host machine 1 to perform the communication 212 with the receiver hose machine 6. In at least one embodiment, the system herein for data plane separation to reuse virtual network addresses may include one or more circuits to communicate configuration information between a SM 220 and available IB switches 116. The configuration information can enable the IB switches 116 to provide communication 212 associated with at least one host machine 1 using a mapping of one virtual network address LID 1 to two or more physical ports (such as, Ports #1 and 3) on the at least one host machine 1. The one virtual network address LID 1 may be associated with different switches S11 and S21 that are on different data planes L1 and L2.

Figure 2B:
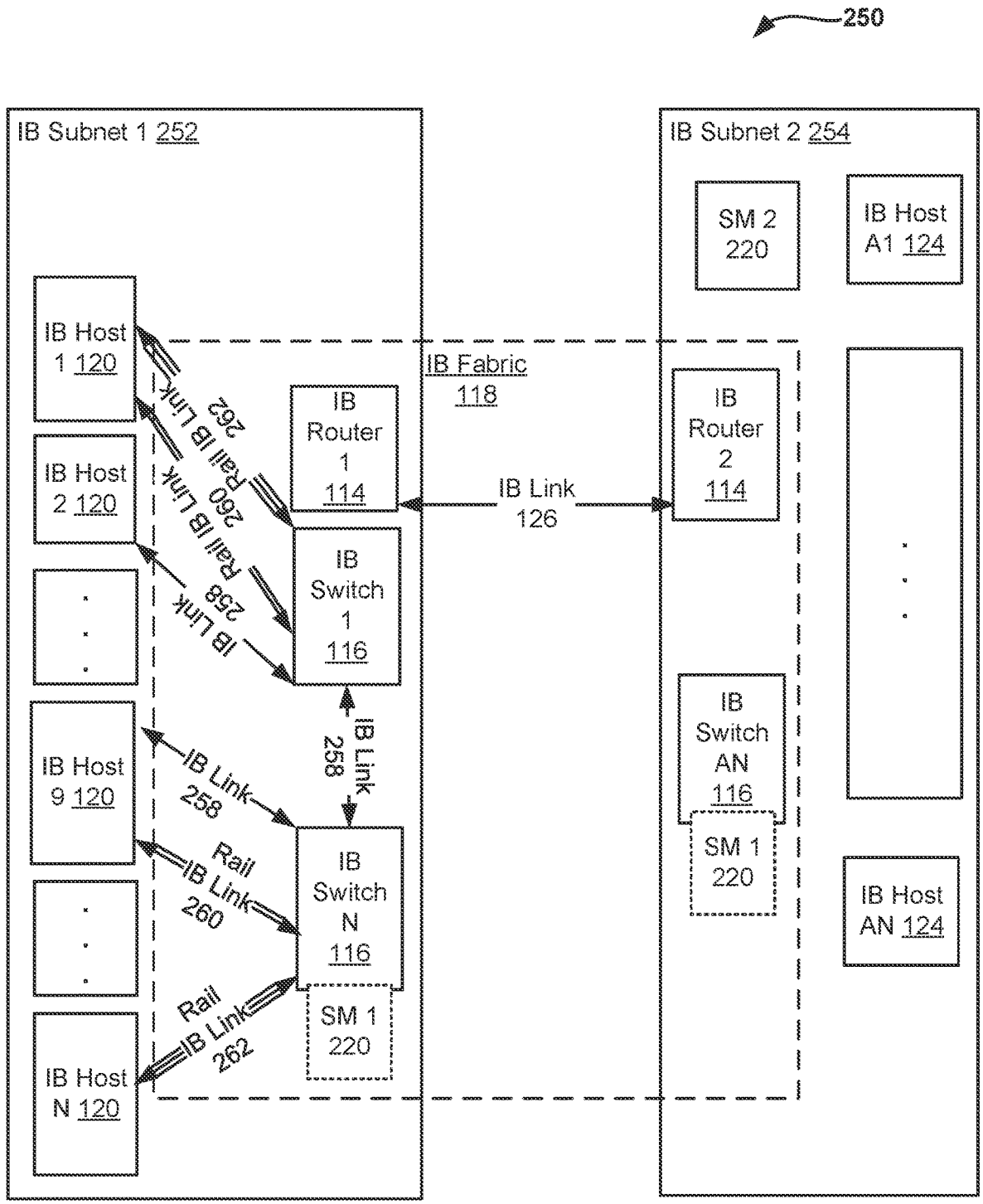
FIG. 2B illustrates IB management aspects of a system for data plane separation in networks to reuse virtual network addresses and for local port grouping for rails of network links, according to at least one embodiment.

FIG. 2B illustrates IB management aspects of a system 250 for data plane separation in networks to reuse virtual network addresses, according to at least one embodiment. For example, the association of physical ports with one virtual network address on different data planes can enable rails of IB network links 258-262 that exclusively use those physical ports for communication between at least two IB host machines 1-N 120; A1-AN 124 in IB networks. Further, IB switches between the two host machines may use different groups of ports to direct IB communication between the IB switches. For example, the rails of network links, with the data plane, use distinct individual physical network addresses (such as, physical LIDs, different than the virtual LIDs 210A). These physical network addresses are associated with individual physical ports 210B of different host machines that may be grouped together. Further, port numbers, as illustrated in FIG. 2A, may be used instead of the physical LIDs.

In at least one embodiment, virtual network addresses (or virtual LIDs) may be used instead of individual physical LIDs or port numbers to address limited physical LIDs available for at least multi-port end-nodes. In at least one embodiment, a multi-port end-node, such as a multi-port endpoint or a multi-port high channel adapter (HCA), may be LID-consuming even if they can reserve knowledge of an exact destination port. Each virtual LID may represent multiple physical LIDs or port numbers, as a result. In addition, relationships between such virtual LIDs may be registered with their data planes, where each relationship represents a rail of network links to make exclusive certain physical ports. This can address limitations in a number of host machines and number of ports available for communication in an IB network.

In at least one embodiment, rails of IB network links 258-262, along with their data planes 204, can also reduce the number of control bits required to ensure configuration in a switched-network fabric without having to communicate broadly, also referred to as a network spray, to multiple ports of multiple host machines. This approach also enables a uniform spreading of network traffic in the switched-network fabric by conserving the network spray from many ports to a limited number of ports. The rails of IB network links 258-262, along with their data planes 204, may be controlled or managed by respective SMs 220 of respective subnets 254.

In at least one embodiment, the communication using rails of IB network links 258-262, along with their data planes 204, is in reference to individual physical ports of at least two IB host machines 1-N 120, A1-AN 124 that are part of a rail of network links and on different data planes so that they are exclusively used in the rail of network links between the at least two host machines. The assignment of virtual LIDs and the relationship between the virtual LIDs may be based in part on one or more of the at least two IB host machines 1-N 120, A1-AN 124 requesting to communicate with each other. The assignment and the relationship of the virtual network addresses are registered in the SM and are passed to one or more switches between a communication path of the at least two host machines to enable, in part, the rails of IB network links 258-262, along with their data planes 204.

In at least one embodiment, the relationship is stored in a rail and data plane forwarding table of an SM to provide mapping between different physical ports, their virtual LIDs, and their data planes. The rails, along with their data planes 204, can divide an IB network into smaller isolated networks so that traffic in the smaller isolated networks cannot be mixed. In a use case of a multi-port endpoints or a multi-port high channel adapters (HCAs), each multi-port HCA can request that a local port be assigned with a rail, along with their data planes 204, such that all of a switched-fabric's multi-port HCAs' local port 1 are isolated from other local ports (such as ports 2, 3, to N), as available in each switched-fabric's multi-port HCA. In at least one embodiment, therefore, there may be groups of local ports between at least two host machines that are part of a rail and plane, whereas there may be other local ports between the same at least two host machines that are not part of a rail and can receive traffic outside the rail of network links established for the at least two host machines.

A rail, along with their data planes 204, optimize a nature of the switched fabric 118, which is the use of virtual LIDs assigned to each endpoint. This approach enables multiple physical LIDs (ports) of a multi-port HCA to be addressed using a single virtual LID. As a result of this approach, traffic that is intended for a specific destination port is received in the destination port based in part on a source port of the traffic, as described further with respect to one or more of the figures herein. This approach eliminates a need to use distinct physical LIDs to direct traffic to each one of the endpoint ports.

FIG. 2B illustrates IB management aspects of a system 250 for local port grouping for rails of network links in IB networks 252, 254 having multiple subnets, along with their data planes 204 for reuse of LIDs, according to at least one embodiment. In at least one embodiment, the system and method herein allow establishing, modifying, and monitoring of the mapping and the relationship for rails of network links, along with their data planes 204, through an SM 220 and at least one subnet management agent (SMA) (such as, SMA 302 in FIG. 3 and the associated description). A host is used interchangeably with a host machine to describe an IB or Ethernet host unless stated expressly otherwise using preceding text IB or Ethernet or with respect to aspects that are IB-related versus aspects that are Ethernet-related, where an IB host is exclusively within an IB network and an Ethernet host is exclusively within an Ethernet network. Further, such exclusivity does not restrict IB to Ethernet communications as described throughout herein.

In FIG. 2B, IB aspects of interconnect devices 112 may represent an IB fabric 118 and can at least include multiple IB switches 1-N 116; AN 116 and one or more IB routers 1 114; 2 114. Such an IB fabric 118 allows one or more IB hosts 1-N 120, A1-An 124 to communicate within a subnet or across subnets over one or more designated IB links 126. Even though illustrated via IB routers, an IB network link 258 can couple together IB switches. These IB host machines may be within a same subnet or in different subnets, as described further with respect to at least FIG. 2B.

In abstraction, an IB network link 126; 258 may be bound to a physical IB port of an IB host 120, but such IB network links 126; 258 may be network links that are not associated with specific physical IB ports, where IB packets are sent between available physical IB ports of a sender host machine and a receiver host machine. Separately, instead of such non-exclusive (non-rail) IB network links 126; 258, rails of IB network links 260; 262 provide communications that is exclusively between physical IB ports of two different IB hosts 1-N 120 of an IB subnet 1 252 or between two different IB hosts A1-AN 124 of a different IB subnet 2 254. Therefore, a rail network links, along with data planes, may be used interchangeably with a network link having exclusive use of physical ports based in part on a mapping and on a relationship registered in at least an SM 220.

Therefore, local port grouping may be enabled for IB host machines 1-N 120, A1-AN 124 in each IB subnet 1 252, 2 254 so that at least two IB host machines 1-N 120, A1-AN 124, in their respective IB subnets 1 252, 2 254, can have their ports associated together to form a rail of network links, along with data planes, between the at least two IB host machines. In one example, an SM 220 can include a mapping of different virtual network addresses and data planes to two or more physical network addresses of two or more physical ports on the at least two host machines, such as virtual LIDs of a first virtual port of a first IB host machine 1 120 on a first data plane and of a second virtual port of a second IB host machine 9 120 on a second data plane may be mapped to two or more of their respective physical ports. This allows multiple physical ports of each of the first IB host machine 1 120 and of the second IB host machine 9 120 to be independently grouped under individuals virtual LIDs and allows same LIDs to be reused for individual hosts.

Further, the SM 220 can also include a relationship between the different virtual LIDs, such as a relationship registered within the SM 220 and between a first virtual LID for the first virtual port, of a first data plane, of the first IB host machine 1 120 and a second virtual LID of the second virtual port, of a second data plane, of the second IB host machine 9 120. In at least one embodiment, the registration may be in the form of a rail-based forwarding table. The mapping and the relationship between the first virtual LID and the second virtual LID enable a number of network links 260 (double-lined to indicate exclusivity) between two or more physical ports, underlying the first virtual LID and the second virtual LID, for communication between the first IB host machine 1 120 and the second IB host machine 9 120.

In at least one embodiment, based on at least the relationship in the rail-based forwarding table, communication between the number of network links 260 is to exclusively use two or more physical ports of the underlying virtual LIDs; however other IB network links 258 from other IB host machines 2 120, N 120, which are outside the relationship between the first IB host machine 1 120 and the second IB host machine 9 120 can be received through the other physical ports. In at least one embodiment, therefore, even with the mapping and the relationship between the first IB host machine 1 120 and the second IB host machine 9 120, each of these IB host machines may include physical ports that are open for IB network links 258 for IB communications without being part of a rails of network links 260.

In at least one embodiment, there may be other groupings of other virtual LIDs to be part of other rails of IB network links 262 for communication between different IB host machines, such as a different rails of IB network links 262, of different data planes, between the first IB host machine 1 120 and a third IB host machine N 120 using different respective underlying local ports that are based in part on different mappings and relationships registered in an SM 220. Therefore, in addition to the mapping 210 for the data plane separation, the SM 220 can also include a relationship (reference 416 in FIG. 4) between other virtual LIDs, such as a relationship registered within the SM 220 and between a third virtual LID for a third virtual port of the first IB host machine 1 120 and a fourth virtual LID of a fourth virtual port of a third IB host machine N 120. The mapping and the relationship between the third virtual LID and the fourth virtual LID enable a number of different IB network links 262 (triple-lined to indicate different exclusivity of underlying physical ports) to be used in communication between the first IB host machine 1 120 and the third IB host machine N 120. As these rails 260, 262 of IB network links enable sending and receiving IB packets between groups of physical or local ports via the mapping between the virtual ports and two or more respective physical or local ports and via the relationship between the virtual ports, local port grouping is achieved between such local port groups.

In at least one embodiment, the SM 220 provides configuration information to one or more SMAs of one or more IB devices between the SM and the IB host machine 120. For example, the configuration information can enable at least one of the IB devices (such as an IB switch 116) to configure its internal forwarding table based in part on the mapping and based in part on the relationship. This configuration information, by virtue of configured forwarding tables in the IB switches, can enable the rails 260, 262 of IB network links. While this is illustrated in IB subnet 1 252, this approach is possible in other subnets, such as a second IB subnet 2 254 using its own SM 220 and its own IB switches AN 116 for IB hosts A1-AN 124. Communication between rails of network links having exclusive use the two or more physical ports can also extend between subnets via IB routers 2 114 that at least communicate IB packets between the subnets till they are locally communicated using the mapping and the relationship within their subnets. However, the benefit is realized from communication between network links having exclusive use the two or more physical ports that divides an IB network into smaller isolated networks so that traffic in the smaller isolated networks cannot be mixed.

Figure 3:
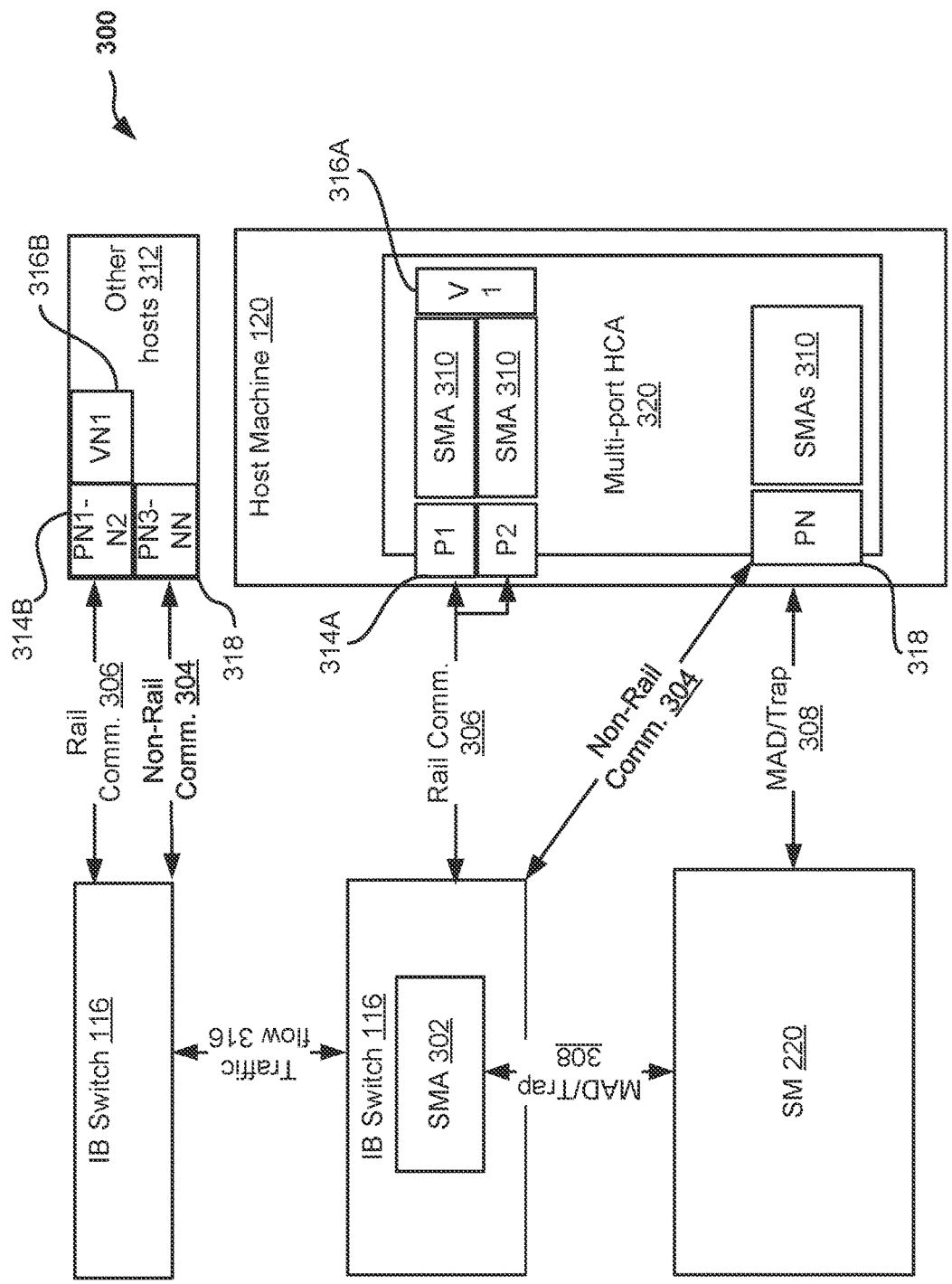
FIG. 3 illustrates further aspects of a system for data plane separation and for local port grouping for rails of network links in IB networks using a subnet manager (SM), according to at least one embodiment.

FIG. 3 illustrates further aspects of a system 300 for data plane separation and for local port grouping for rails of network links in IB networks using a subnet manager (SM) 220, according to at least one embodiment. The system 300 is provided for data plane separation and for local port grouping for at least two host IB machines 120, 312 in at least a subnet of an IB network 1 252; 2 254. An SM 220 can include a mapping 210, as described with respect to FIG. 2A for the data plane separation and can include a further mapping for the local port grouping. For example, the further mapping is of different virtual network addresses V1 316A, VN1 316B (reflecting virtual LIDs C 412 and C1 432 in FIG. 4) to two or more physical network addresses (reflecting LIDs A 414, B 414, and A1 434, B1 434 in FIG. 4) of two or more physical ports P1-P2 314A, and PN1-N2 314B on the at least two IB host machines 120, 312. In addition, the SM can include a relationship between the different virtual network addresses V1 316A, VN1 316B to enable the rails 306 of network links that exclusively use the two or more physical ports P1-P2 314A and PN1-N2 314B, (and any specific data planes) between the at least two host machines. There may be other open or non-rail ports PN 318 or PN3-NN 318 to support non-rail communication 304 between the same host machines. In at least one embodiment, in each of the at least two IB host machines 120; 312, the ports P1-P2 314A, PN1-N2 314B, PN 318, and PN3-NN 318 are ports associated with a multi-port HCA 320.

Figure 4:
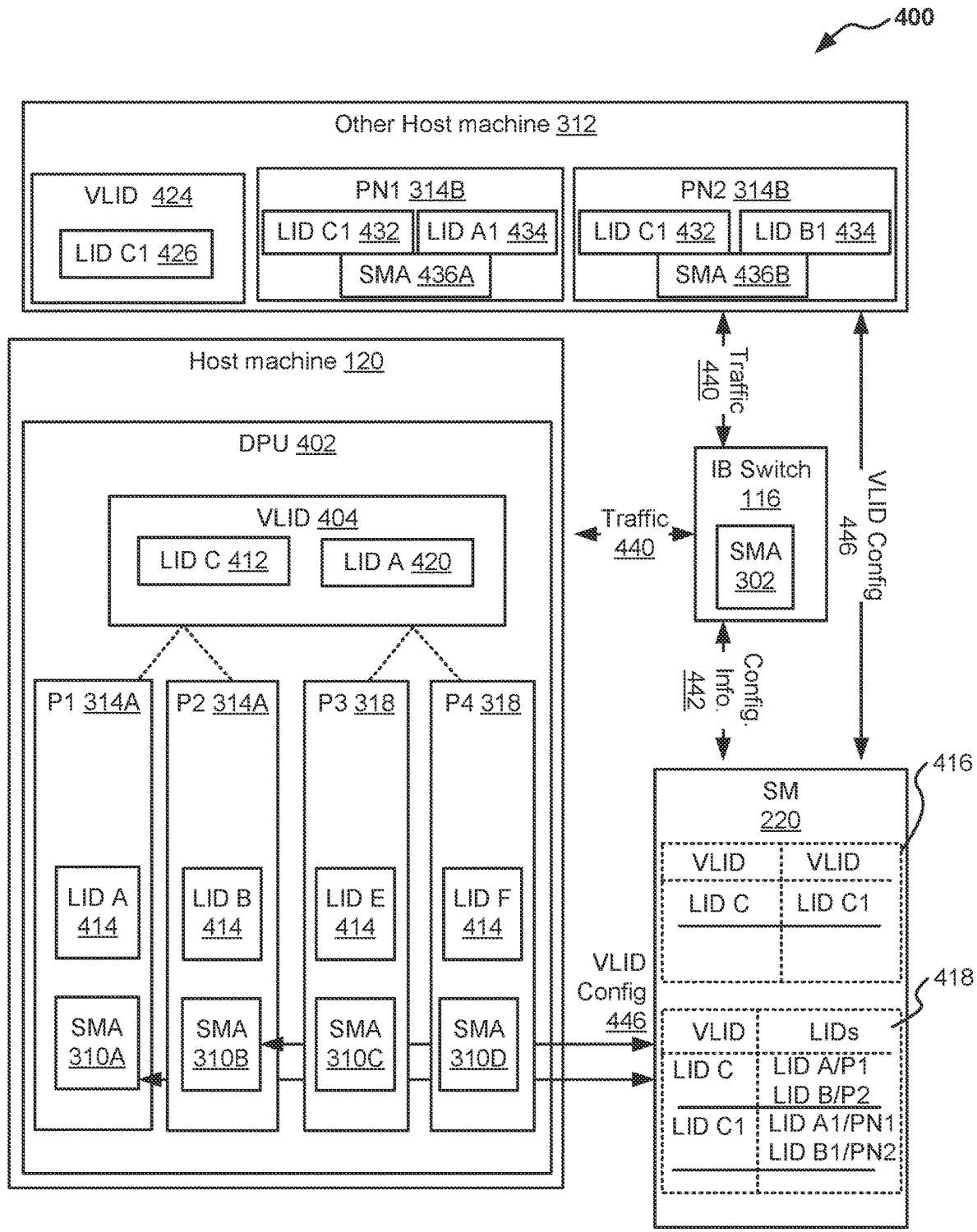
FIG. 4 illustrates still further aspects of a system for data plane separation and for local port grouping using an SM having a mapping of different virtual network addresses and a relationship between the different virtual network addresses, according to at least one embodiment.

FIG. 4 illustrates still further aspects of a system 400 for data plane separation and for local port grouping for rails of network links in IB networks using an SM 220 having different mappings for these requirements. In at least one embodiment, a data processing unit (DPU) 402 may provide communication capabilities in each host machine, such as illustrated for one host machine 120. For example, in addition to the mapping 210 described with respect to FIG. 2A for the data plane separation, the SM 220 can include a further mapping 418 of different virtual network addresses (such as, LID C 412 to LIDs A/P1 and B/P2 414) and having a relationship 416 between the different virtual network addresses (such as LID C 412 and LID C1 426; 432), according to at least one embodiment. Each DPU 402 may track, collectively, its associated virtual LIDs 404; 424. This further mapping may be used for exclusive communication. In at least one embodiment, at least one IB switch 116 may be between the at least two IB host machines 120, 312 to receive configuration information 442 from the SM with regards to both such mappings. Further, the configuration information may be associated with the mappings 210, 418 and the relationship 416 of the different virtual network addresses 412, 432. In at least one embodiment, a local LID 414 (such as LID A) of a physical port 314A may be used as a virtual network address, such as illustrated with LID A 420 mapping against other physical network addresses LID E 414, LID F 414. Further, the local LID (such as LID A) may be mapped against itself and other physical network addresses LID E 414, LID F 414.

As discussed with respect to FIGS. 2A-3, instead of the physical network address, directed routing may be used where the mapping 418 in the SM 220 is between ports 314A, 318B by port numbers P1, P2, PN1, PN2 210B (in FIG. 2A) in a respective IB host machine 120 to the virtual network addresses 412, 432. In directed routing, a packet header may include local port numbers, according two vectors, such as a forward path and a response path. A class in the packet header may indicate which type of addressing is used, such as Class 1 indicating LIDs or Class 81 indicating directed routing. A number of hops between a sending host machine (or closest switch) and a receiving host machine (or closes switch) may be used to list, at each hop, what exit port to take. For example, a packet from a sending host machine and intended for a receiving host machine may require three hops to reach the receiving host machine. A packet header of such a packet may include a list of 1, 3, 5, indicating that at a first hop, the first exit port is used, at a second hop, a third exit port is used, and at a third hop, a fifth exit port is used. Therefore, at least the port numbers may be used in the mapping for the two or more physical ports to the virtual network addresses.

In at least one embodiment, the configuration information 446 can enable the at least one IB switch 116 to provide the communication between the at least two IB host machines 120, 312 through the rails 306 of network links. While generally illustrated as traffic flow 440, this traffic flow 440 can include exclusive rail traffic for exclusive physical ports and can include other non-rail traffic for non-exclusive physical ports from the IB switch 116. Further, while illustrated differently, the configuration information 446 is sent via the same IB switch 116 and the same physical ports addressable by the physical port addresses 314A, 314B, 318. The SM 220 may not be involved in traffic flow 440, whether using rails or non-rails communication or traffic, between the IB host machines 120, 312 through one or more IB switches 116.

In at least one embodiment, the mapping 418 and the relationship 416 may be in rail-based forwarding tables and are based in part on one or more of the at least two IB host machines 120, 312 requesting to communicate with each other and may be further based in part on the request including the use of a rail of network links. In at least one embodiment, the communication between the rails 306 of network links may not interfere with other non-rail communication 304 from other host machines 312 that are outside the rails to be received through other than the two or more physical ports 314A, 314B that are in a rail of a network links between the at least two IB host machines 120, 312. For example, there may be other ports 318 of the at least two IB host machines 120, 312 and of other host machines to support non-rail communication 304.

In at least one embodiment, an interface of the SM is able to receive a request for the communication to use rails of network links between two host machines. The SM can update or register at least the relationship 416 between the different virtual network addresses based in part on the request. In at least one embodiment, the interface uses management datagram (MAD) messaging and trap messaging 308 and the SM is able to make updates to its rail-based forwarding tables. Further, an IB software service of the host machine or of an endpoint can enable the configuration information 446 to be communicated between the SM and a plurality of SMAs of the two or more physical ports using the MAD messaging and trap messaging 308.

In at least one embodiment, the SMAs 302, 310A-D, 436A, 436B can respond to at least the MAD messaging and trap messaging 308. For example, the SMAs can provide MAD messaging and trap messaging 308 for notifying the SM 220 for the different virtual network addresses 412 to the two or more physical ports 314A, 314B. The SMAs can provide messaging and trap messaging 308 to request for the different virtual network addresses 412 to the two or more physical ports 314A, 314B. The SMAs can provide messaging and trap messaging 308 for notifying the SM 220 about changes to the different virtual network addresses 412 of the two or more physical ports 314A, 314B. These changes may include updates to the data planes, the virtual LIDs, and one or more of the mappings described herein. The two or more physical ports 314A, 314B may be associated with two or more physical network addresses 414 and with different data planes. The SMAs can also provide trap messaging 308 notifying about the communication.

In at least one embodiment, the MAD messaging and trap messaging 308 may include the two or more physical network addresses 414 of the two or more physical ports 314A, 314B in a source and destination address header field.

In at least one embodiment, the SM 220 may be enabled to assign the virtual network addresses 412, 432 to the two or more physical ports 314A, 314B on the at least two IB host machines 120, 312, where the two or more physical ports are associated with two or more physical network addresses 414, 434. The SM is not involved in the traffic between the at least two IB host machines 120, 312, but the configuration information may be provided through the same IB network links 258 and therefore to the physical ports even if illustrated by separate lines in at least FIGS. 3 and 4.

In at least one embodiment, the SM 220 is further adapted to receive a request for communication, such as via the MAD messaging and trap messaging 308. The request may be from a first IB host machine 120 of the at least two host machines and may specify a second IB host machine 312 of the at least two host machines as a destination host machine, for instance, of the communication. The SM is further to determine the different virtual network addresses 412, 432 to be associated with the first one of the at least two host machines and a second one of the at least two host machines. In at least one embodiment, the different virtual network addresses 412, 432 may be associated with the devices as part of a sweep performed by the SM of all the connected devices. The association between the virtual and physical network addresses is a mapping 418 stored in part of or a distinct table of the rail-based forwarding table. The SM is further to register the relationship 416 of the different virtual network addresses for the communication as part of or a distinct table of the rail-based forwarding table. The relationship 416 enables network links that exclusively use the two or more physical ports underlying the virtual network addresses of the relationship and the mapping.

In at least one embodiment, after a request for the communication, the SM 220 is further adapted to check that at least a second host machine 312 of the at least two host machines is associated with at least one of the different virtual network addresses. However, this check may be performed by each one of the host machines to be in communication. In at least one embodiment, the request for the communication may come from a virtual network address and so, the check may be performed only for the other parties to be associated together in the communication.

In at least one embodiment, a previous mapping may be in effect for the virtual and physical network addresses for the second host machine 312 of the at least two host machines. For example, the existence of the mapping 418 between LID C1 and LIDs A1/PN1 and B1/PN2 in the SM is indicative of a previous association. Thereafter, the registering of the relationship 416 of the different virtual network addresses LID C and LID C1 for the communication may be performed. For example, a first virtual address LID C of a first IB host machine 120 of the two host machines may be registered as related to a second virtual address LID C1 of the second host machine 312 of the two host machines, which exclusively groups the underlying physical ports LID A, LID B, LID A1, and LID B1 to provide network links to be used in the communication between the two IB host machines 120, 312. In addition, the virtual LIDs may be associated with specific data planes so that they may be reused for different groups the underlying physical ports. There may be other non-rail ports LID E 414 and LID F 414 remaining in at least one of the IB host machines 120 for non-rail communications in the IB network.

In at least one embodiment, an SM 220 is further adapted to determine that a second host machine 312 of the at least two host machines is to be associated with at least one of different virtual network addresses. This may be the case when no ports of the first IB host machine 120 of the at least two host machines are associated with a virtual network address. The SM is to enable the at least one of the different virtual network addresses by mapping the local port LIDs A1 and B1 to a virtual network address LID C1. The SM is further to then register a relationship of the different virtual network addresses LID C with LID C1 for the network links that exclusively use their underlying two or more physical ports for communication, based at least in part on a request for such communication between the at least two host IB machines 120, 312.

In at least one embodiment, a system herein includes one or more processing units to communicate configuration information between a SM and at least one switch. The processing units may be within an IB switch or an IB host that is able to function as an SM and may be within other IB devices having SMAs to communicate with the SM. The configuration information is to enable the at least one switch to provide communication between at least two host machines through a rail of network links that exclusively use two or more physical ports of the at least two host machines. The configuration information may be associated with a mapping and a relationship of different virtual network addresses of the underlying two or more physical ports. For example, the mapping may be between the different virtual network addresses and the two or more physical ports on the at least two host machines. The relationship may be between the different virtual network addresses to indicate that the underlying physical ports to the virtual network addresses are to be used exclusively in a rail of network links for the communication.

In at least one embodiment, the one or more processing units of the SM are further adapted to monitor individual ones of the two or more physical ports using trap messaging from at least one SMA. The trap messaging may provide status updates of the ports, for instance. The one or more processing units are further adapted to enable changes for the at least two host machines or the at least one switch, via the configuration information, based in part on a change indicated by at least one SMA to the SM, which causes the SM to update its rail-based forwarding table to remove the relationship between the at least two host machines. The SM can communicate this change to the respective SMAs.

Figure 5A:
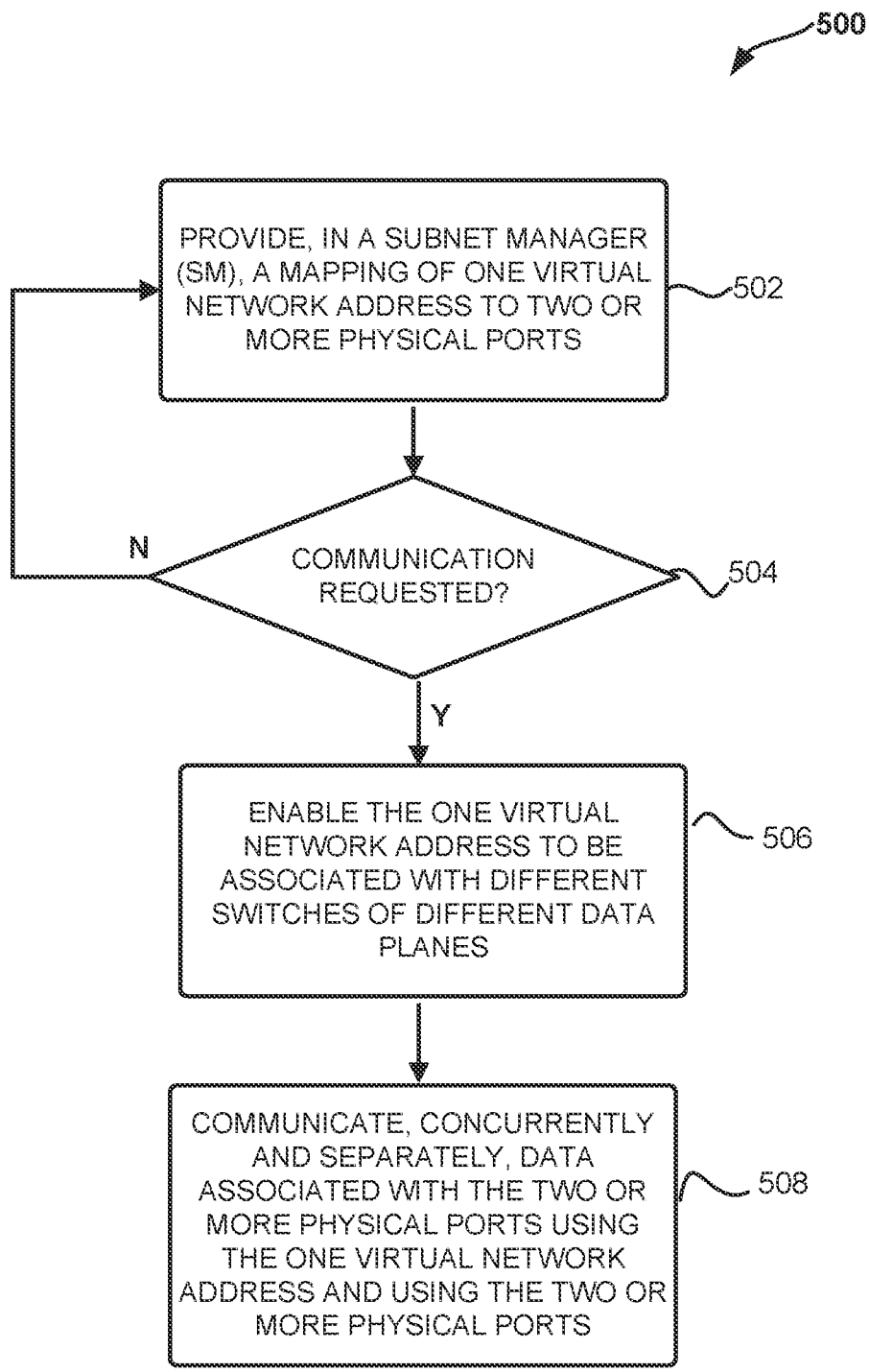
FIG. 5A illustrates a process flow for data plane separation in networks to reuse virtual network addresses, according to at least one embodiment.

FIG. 5A illustrates a process flow or method 500 for data plane separation in networks to reuse virtual network addresses, according to at least one embodiment. For example, the method 500 may be used for addressing while providing the data plane separation to allow reuse virtual network addresses. The method 500 includes providing 502, in a SM, a mapping of one virtual network address to two or more physical ports on a host machine. A verification 504 may be performed that a communication is requested form the host machine. The method 500 includes enabling 506 the one virtual network address to be associated with different switches of different data planes. Further, the method 500 includes communicating 508, concurrently and separately, data associated with the host machine using the one virtual network address and using the two or more physical ports.

In at least one embodiment, the method 500 using the different data planes provides physical separation for traffic associated with the two or more physical ports. For example, the physical separation for traffic may be provided by different switches. However, the method 500 supports virtual data plane separation in networks to reuse virtual network addresses. For example, instead of data plane separation that may include physical separation (such as, using different switches), logical or virtual data plane separation may be enabled, in part by rail optimization, as described in one or more of FIGS. 3, 4, in which a switch can be divided into "virtual switches" with a logical separation that is implemented by forwarding logic and without a need for physical separation. Therefore, as used herein, data plane separation may be physical or virtual. In either case, data plane separation may be enabled by a subnet manager (SM) that includes a mapping of one virtual network address to two or more physical ports on a host machine. In addition, local port grouping may be provided, as an abstraction, that is referred to herein as rails of network links between such local port groups in two host machines to a single virtual network address, to provide the logical or virtual data plane separation. The network links can exclusively use the physical ports that are grouped together for IB communication between the host machines.

Figure 5B:
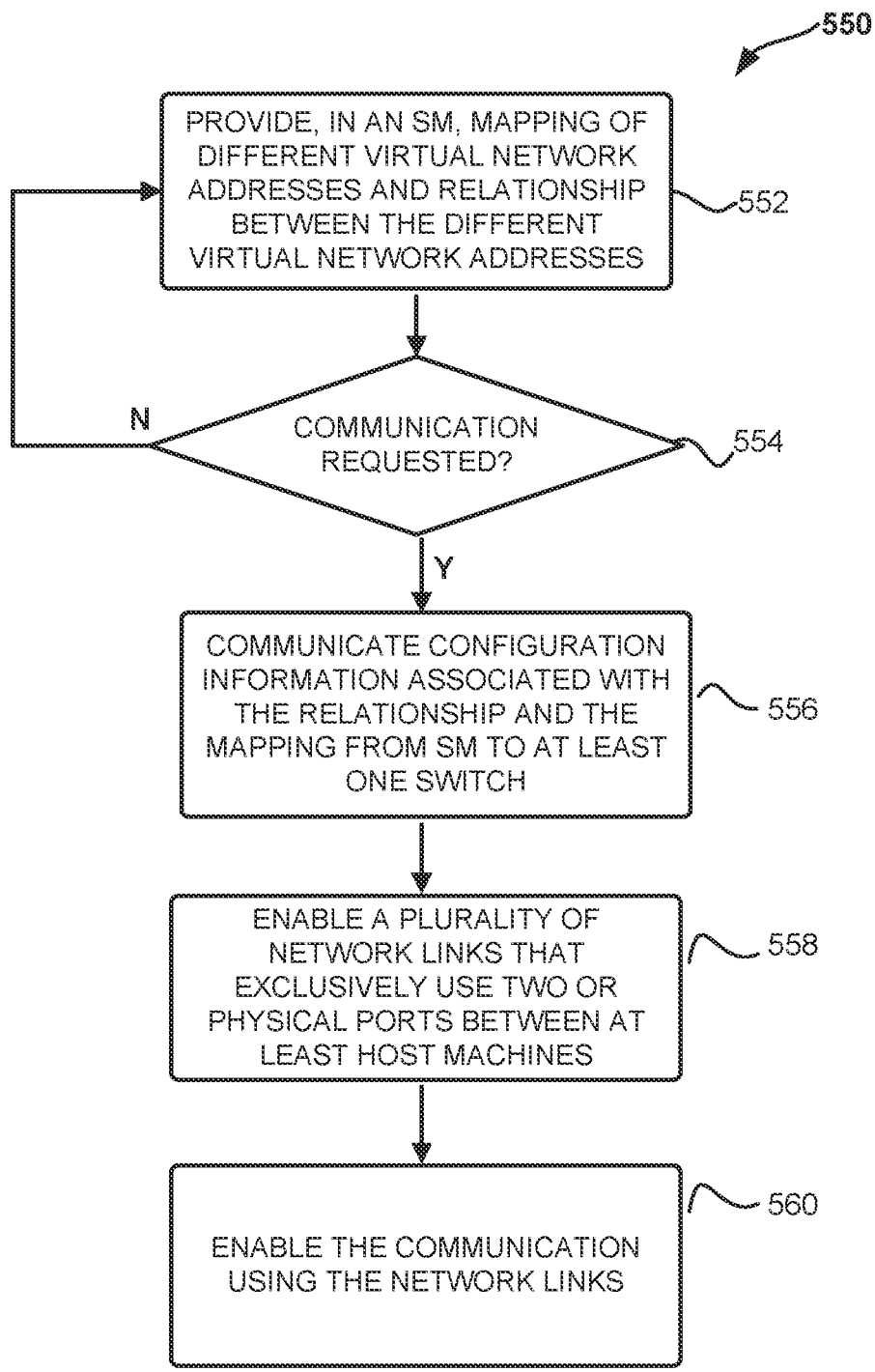
FIG. 5B illustrates a process flow for data plane separation and for local port grouping in networks to enable exclusive communication, according to at least one embodiment.

FIG. 5B illustrates a process flow or method 550 for data plane separation and for local port grouping in networks to enable exclusive communication, in at least one embodiment. The method 550 may be for local port grouping for at least two host machines in a network. The method 550 includes providing 552, in a subnet manager (SM), a mapping of different virtual network addresses to two or more physical ports on the at least two host machines and a relationship between the different virtual network addresses. In at least one embodiment, the two or more physical ports have respective physical network addresses. However, at least one of the different virtual network addresses may used for multiple ones of the respective physical network addresses to provide data plane separation with the local port grouping in networks to enable exclusive communication.

In at least one embodiment, the method 550 includes verifying or determining 554 that communication is requested between the at least two host machines. For example, at least one of the two host machines can communicate a request for communication with a second one of the at least two host machines by identifying a destination network address for a physical port of the second one of the two host machines. The request may include a request for rails of network links to be established between the at least two host machines.

In at least one embodiment, the method 550 includes communicating 556 configuration information from the SM to at least one switch. However, there may be multiple switches in an IB network between the at least two host machines and so the communication of the configuration information from the SM may be to all such switches. The configuration information is associated with the mapping and the relationship of the different virtual network addresses. For example, the at least one switch determines that a mapping for the physical port of the second one of the two host machines exists with respect to a first virtual network address. The at least one switch can determine that the first virtual address is associated with a second virtual address related to the first one of the two host machines that is requesting the communication.

In at least one embodiment, the method 550 includes enabling 558 the at least one switch to use the configuration information to provide network links that exclusively use the two or more physical ports for communication between the at least two host machines. Once the network links are provided, the method 550 includes enabling 560 the two host machines to communicate using the network links. For example, the traffic between the at least two host machines need not reviewed by the SM but passes directly between the at least two host machines without regard to the SM using the underlying virtual LIDs of the relationship, which in turn use the underlying physical LIDs of the mapping.

In at least one embodiment, the method 550 includes a further step or sub-step for the mapping and the relationship to be based in part on one or more of the at least two host machines requesting to communicate with each other. In at least one embodiment, the method 550 includes a further step or sub-step for monitoring individual ones of the two or more physical ports and to enable changes for the communication between the at least two host machines using the configuration information. The changes may be based in part on a request by at least one of the at least two host machines. For example, the request may be to cancel a rail of network links previously between the at least two host machines. The SM enables the change so that the communication does not use the rails of network links. The SM removes the relationship previously in the rail-based forwarding table and so the any further communication may occur without the rails.

In at least one embodiment, the method 550 includes a further step or sub-step for receiving, using an interface of the SM, a request for the communication. The interface may be a network interface to receive MAD and trap messages, for instance. The SM can update its rail-based forwarding table or register, in the rail-based forwarding table, at least the relationship between the different virtual network addresses based in part on the request. In at least one embodiment, the method 550 includes a further step or sub-step for assigning, using the SM, the virtual network addresses to the two or more physical ports on the at least two host machines.

In at least one embodiment, the method 550 includes a further step or sub-step for enabling, using an IB software service of the host machine or of an endpoint, the configuration information to be communicated between the SM and the SMAs of the two or more physical ports using MAD messaging. In at least one embodiment, such an IB software service is accessible to an administrator to configure changes for the IB network.

Figure 6A:
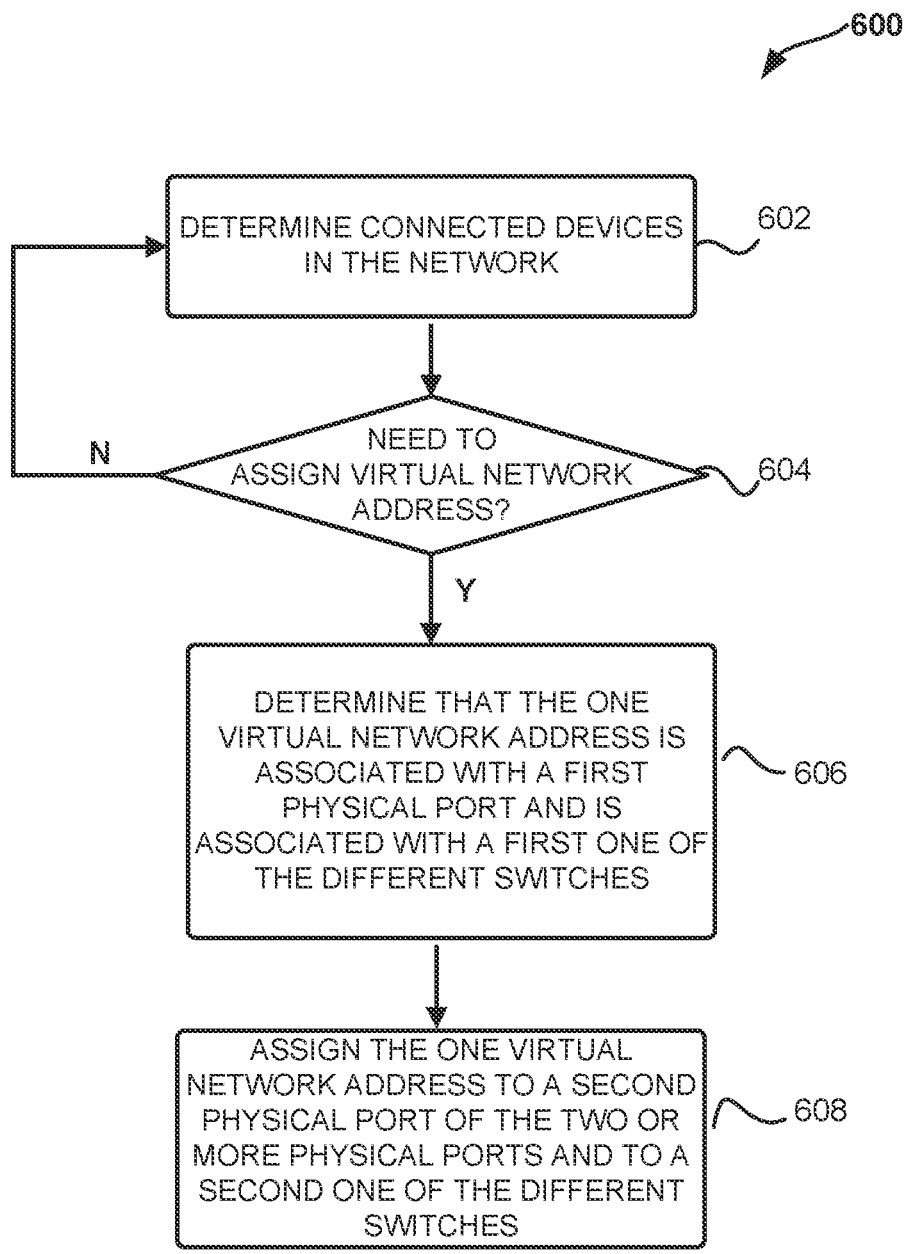
FIG. 6A illustrates process flow to support data plane separation in networks to reuse virtual network addresses, according to at least one embodiment.

FIG. 6A illustrates a process flow or method 600 to support data plane separation in networks to reuse virtual network addresses, according to at least one embodiment. The method 600 may be used to assign the one virtual network addresses for physical ports. For example, the method 600 includes determining 602 connected devices in the network. In the determining 602 step, if ports or connected devices are identified, then a verification 604 may be performed to find whether these ports or connected devices have a need to be assigned at least a virtual network address.

The method 600 includes determining 606 that one virtual network address is associated with a first physical port of the two or more physical ports on the host machine. This step 606 may be used to ensure that virtual network addresses that are already assigned may be reused. The method 600 includes verifying as part of the determining 606 step that the one virtual network address is also associated with a first one of the different switches. Then, it is possible in the method 600 to reuse the one virtual network address with another switch. Therefore, the method 600 includes assigning 608 the one virtual network address to a second physical port of the two or more physical ports on the host machine and to a second one of the different switches.

In at least one embodiment, the method 600 includes a further step or sub-step for allowing re-use of the one virtual network address for the different data planes by updating the mapping to associate the one virtual network address to different ones of the two or more physical ports on the host machine and to the different switches of the different data planes. The method 600 includes a further step or sub-step for using a combination of one of the different data planes and the one virtual network address to uniquely identify one of the two or more physical ports on the host machine for traffic communicated through the different switches.

Figure 6B:
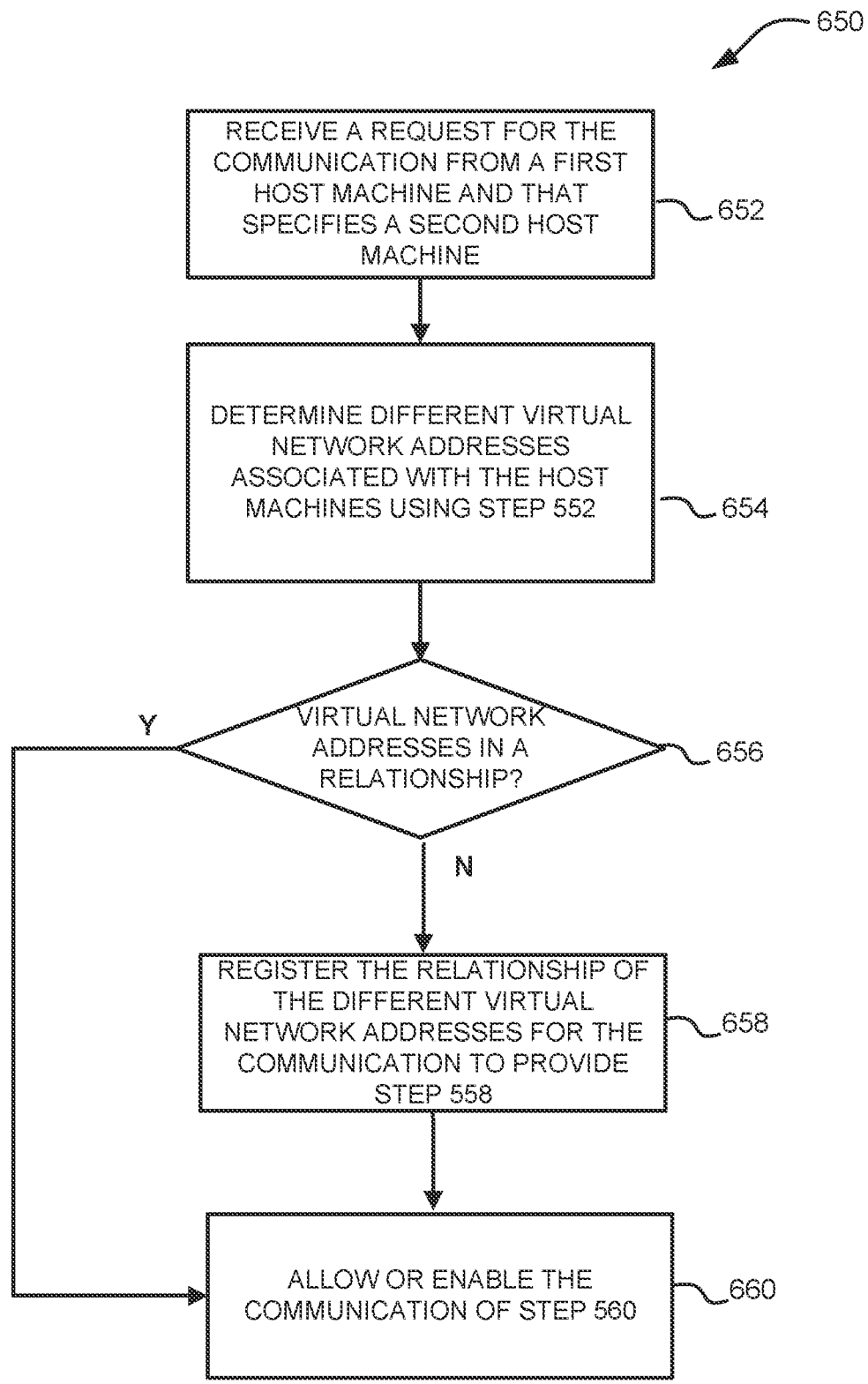
FIG. 6B illustrates another process flow for data plane separation and for local port grouping in networks to enable exclusive communication, according to at least one embodiment.

FIG. 6B illustrates another process flow or method 650 for data plane separation and for local port grouping in networks to enable exclusive communication, according to at least one embodiment. The method 650 includes receiving 652 a request for the communication. The request may be received in an SM. The request may be from a first one of the at least two host machines and may specify a second one of the at least two host machines. The second one of the at least two host machines may be specified by a destination LID that may be a physical LID of a port of the second one of the at least two host machines.

In at least one embodiment, the method 650 includes determining 654 different virtual network addresses associated with the first one of the at least two host machines and a second one of the at least two host machines. The determining 654 step may further include verifying that the different virtual network addresses are associated with specific data planes to ensure that traffic for the first one of the two host machines and for the second one of the two host machines do not cross or remain separated and are for intended physical ports. For example, the physical LID may be mapped to a virtual LID in an SM and to a data plane in the SM. Both host machines may have respective virtual LIDs that are different and are of different data planes. The determination 654 may be performed using one or more mappings in the SM of the rail-based forwarding tables and of the data planes. A verification 656 may be performed in the method 650 for a relationship that may exist between the respective virtual LIDs. Communication may be allowed or enabled via step 660 based in part on the relationship existing between the respective virtual LIDs. In at least one embodiment, the relationship may be provided between data planes instead of the respective virtual LIDs.

In at least one embodiment, however, the method 650 includes registering 658 the relationship of the different virtual network addresses or LIDs to provide network links that exclusively use underlying physical ports of the related virtual LIDs for the communication. The communication may be allowed or enabled 660 after the registering step 658. In at least one embodiment, the SM may monitor and update the rail-based forwarding table periodically to ensure the relationship exists or may check at a start of a period or session of communications using the physical or virtual LIDs associated with the communication till a change is detected to cause the communication to become non-rail communication or traffic.

In at least one embodiment, the method 650 includes a further step or sub-step for checking that a second one of the at least two host machines is associated with at least one of the different virtual network addresses as in step 656. The method 650 includes registering 658 the relationship of the different virtual network addresses to provide the rails of network links that exclusively use underlying physical ports to the related different virtual network addresses to provide the communication. The registering step 658 may be based in part on the request in step 652 for the communication.

Figure 7A:
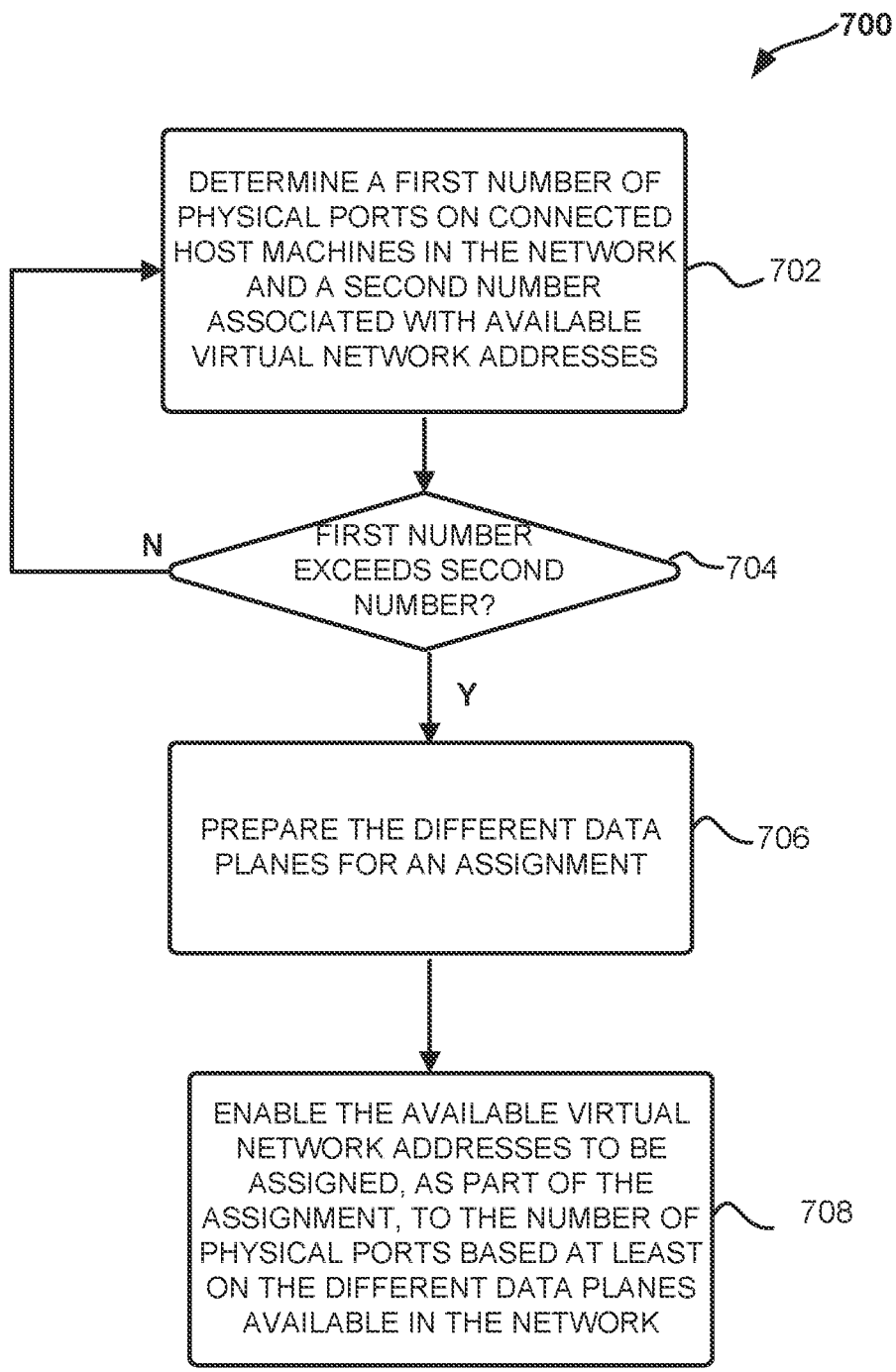
FIG. 7A illustrates yet another process flow for data plane separation in networks to reuse virtual network addresses, according to at least one embodiment.

FIG. 7A illustrates yet another process flow or method 700 for data plane separation in networks to reuse virtual network addresses, according to at least one embodiment. In one example, the method 700 may be used to prepare the different data planes for assignment of the different virtual LIDs. The method 700 includes determining 702 a first number of physical ports on connected host machines in the network and a second number associated with available virtual network addresses. The method 700 includes verifying 704 that the first number exceeds the second number. The method 700 includes preparing 706 the different data planes for an assignment. The method 700 includes enabling 708 the available virtual network addresses to be assigned, as part of the assignment, to the number of physical ports based at least on the different data planes available in the network.

Figure 7B:
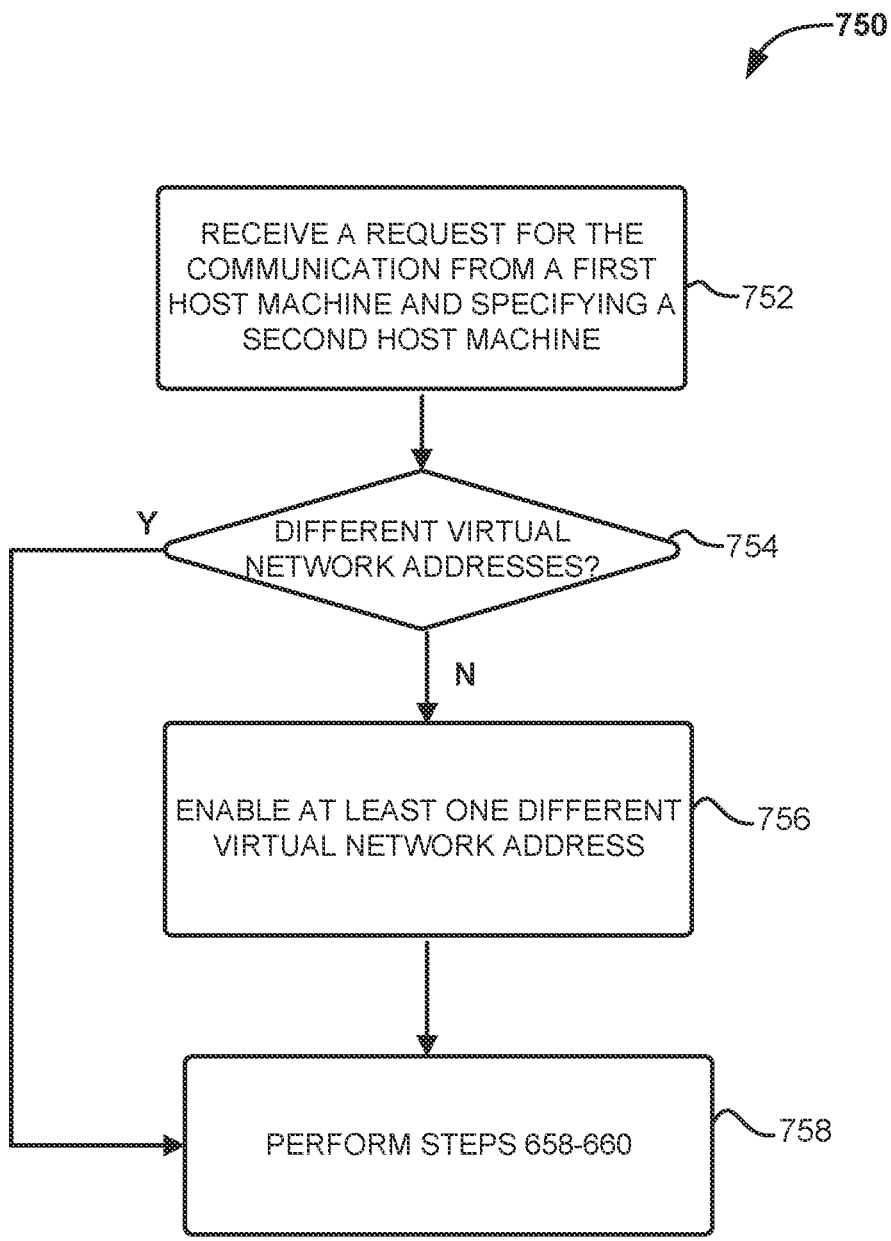
FIG. 7B illustrates yet another process flow for data plane separation and for local port grouping in networks to enable exclusive communication, according to at least one embodiment.

FIG. 7B illustrates yet another process flow or method 750 for data plane separation and for local port grouping in networks to enable exclusive communication, according to at least one embodiment. The method 750 may be performed once the data plane separation is ensured using the method 700 in FIG. 7A. The method 750 includes receiving 752 a request for the communication, such as in a similar manner as step 652 in method 650. The request in step 752 may be similarly received in an SM. The request may be from a first one of the at least two host machines and may specify a second one of the at least two host machines. The method 750 includes verification or determination 754 that a first or a second one of the at least two host machines is to be associated with different virtual network addresses. However, it is also possible to use an association between different data planes instead of the different virtual network addresses.

The method 750 includes enabling 756 at least one of the different virtual network addresses. In at least one embodiment, the virtual network addresses are communicated from the SM to the SMAs or respective physical ports of the at least two host machines. The respective physical ports are the physical ports intended to be exclusively in a rail of network links so that communication between the at least two host machines can use the rail of network links. The method 750 includes performing 758 steps 658-660 to register the relationship of the different virtual network addresses enabled for the respective physical ports so that the rail of network links can support communication there through using the different virtual network addresses for the underlying respective ports.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. In at least one embodiment, use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, term "plurality" indicates a state of being plural (e.g., "a plurality of items" indicates multiple items). In at least one embodiment, number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors.

In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. In at least one embodiment, set of non-transitory computer-readable storage media comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

In at least one embodiment, an arithmetic logic unit is a set of combinational logic circuitry that takes one or more inputs to produce a result. In at least one embodiment, an arithmetic logic unit is used by a processor to implement mathematical operation such as addition, subtraction, or multiplication. In at least one embodiment, an arithmetic logic unit is used to implement logical operations such as logical AND/OR or XOR. In at least one embodiment, an arithmetic logic unit is stateless, and made from physical switching components such as semiconductor transistors arranged to form logical gates. In at least one embodiment, an arithmetic logic unit may operate internally as a stateful logic circuit with an associated clock. In at least one embodiment, an arithmetic logic unit may be constructed as an asynchronous logic circuit with an internal state not maintained in an associated register set. In at least one embodiment, an arithmetic logic unit is used by a processor to combine operands stored in one or more registers of the processor and produce an output that can be stored by the processor in another register or a memory location.

In at least one embodiment, as a result of processing an instruction retrieved by the processor, the processor presents one or more inputs or operands to an arithmetic logic unit, causing the arithmetic logic unit to produce a result based at least in part on an instruction code provided to inputs of the arithmetic logic unit. In at least one embodiment, the instruction codes provided by the processor to the ALU are based at least in part on the instruction executed by the processor. In at least one embodiment combinational logic in the ALU processes the inputs and produces an output which is placed on a bus within the processor. In at least one embodiment, the processor selects a destination register, memory location, output device, or output storage location on the output bus so that clocking the processor causes the results produced by the ALU to be sent to the desired location.

Accordingly, in at least one embodiment, computer systems are configured to implement one or more services that singly or collectively perform operations of processes described herein and such computer systems are configured with applicable hardware and/or software that allow performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. In at least one embodiment, process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. References may also be made to providing, outputting, transmitting, sending, or presenting analog or digital data. In at least one embodiment, processes of providing, outputting, transmitting, sending, or presenting analog or digital data can be accomplished by transferring data as an input or output parameter of a function call, a parameter of an application programming interface or inter-process communication mechanism.

Although descriptions herein set forth example implementations of described techniques, other architectures may be used to implement described functionality, and are intended to be within scope of this disclosure. Furthermore, although specific distributions of responsibilities may be defined above for purposes of description, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A system for communication in a network, comprising:
a subnet manager (SM) to comprise a mapping table of one virtual network address assigned to two or more physical ports, wherein the one virtual network address is associated with different switches of different data planes, and wherein data associated with the two or more physical ports is communicated concurrently and separately using the one virtual network address and using the two or more physical ports.

2. The system of claim 1, wherein the different data planes provide physical separation for traffic associated with the two or more physical ports.

3. The system of claim 1, wherein the SM is further to:
determine connected devices in the network;
determine that the one virtual network address is associated with a first physical port of the two or more physical ports on a host machine and is associated with a first one of the different switches; and
assign the one virtual network address to a second physical port of the two or more physical ports on the host machine and to a second one of the different switches.

4. The system of claim 1, wherein the SM is further to:
allow re-use of the one virtual network address for the different data planes by updating the mapping table to associate the one virtual network address to different ones of the two or more physical ports and to the different switches of the different data planes.

5. The system of claim 1, wherein the SM is further to:
use a combination of one of the different data planes and the one virtual network address to uniquely identify one of the two or more physical ports on a host machine for traffic communicated through the different switches.

6. The system of claim 1, wherein the SM is further to:
provide first configuration information to a first switch of the different switches to identify the one virtual network address and a first one of the two or more physical ports; and
provide second configuration information to a second switch of the different switches to identify the one virtual network address and a second one of the two or more physical ports.

7. The system of claim 1, wherein the SM is further to:
determine that a first number of physical ports on connected host machines in the network exceed a second number associated with available virtual network addresses;
prepare the different data planes for an assignment; and
enable the available virtual network addresses to be assigned, as part of the assignment, to the first number of physical ports based at least on the different data planes available in the network.

8. A system for communication in a network, comprising:
at least one switch to be part of a first data plane and to receive configuration information from a subnet manager (SM), the configuration information associated with a mapping table in the SM comprising a mapping of one virtual network address assigned to two or more physical ports and to enable the at least one switch to communicate, concurrently and separately, with a further switch of a second data plane using the two or more physical ports that are represented by the one virtual network address.

9. The system of claim 8, wherein the SM is further to:
receive a request for communication from a sender host machine and specifying a receiver host machine; and
associate the one virtual network address with a first one of the two or more physical ports of the sender host machine and with the first data plane, the one virtual network address associated with a second one of the two or more physical ports of the sender host machine and with the second data plane to enable the sender host machine to perform the communication with the receiver hose machine.

10. The system of claim 8, wherein the SM is further to:
allow re-use of the one virtual network address by updating the mapping table to assign the one virtual network address to different ones of the two or more physical ports on a host machine and to further switches of further data planes.

11. The system of claim 8, wherein the SM is further to:
provide the configuration information to the at least one switch to identify the one virtual network address and a first one of the two or more physical ports on a host machine; and
provide second configuration information to the further switch to identify the one virtual network address and a second one of the two or more physical ports on the host machine.

12. The system of claim 8, wherein the SM is further to:
determine that a first number of physical ports on connected host machines in the network exceed a second number associated with available virtual network addresses;
prepare the first data plane and the second data plane for an assignment; and
enable the available virtual network addresses to be assigned, as part of the assignment, to the first number of physical ports based at least on the first data plane and the second data plane.

13. A system comprising:
one or more circuits to communicate configuration information between a subnet manager (SM) and a plurality of switches to enable the plurality of switches to provide communication between the plurality of switches using a mapping table of one virtual network address assigned to two or more physical ports that are associated with the plurality of switches, wherein the one virtual network address is associated with different switches of the plurality of switches that are on different data planes, and wherein the communication occurs concurrently and separately using the one virtual network address and using the two or more physical ports.

14. The system of claim 13, wherein the SM is further to:
receive a request for communication from a sender host machine and specifying a receiver host machine; and
associate the one virtual network address with a first one of the two or more physical ports of the sender host machine and with a first data plane of the different data planes, and the one virtual network address with a second one of the two or more physical ports of the sender host machine and with a second data plane of the different data planes to enable the sender host machine to perform the communication with the receiver hose machine.

15. The system of claim 13, wherein the SM is further to:
allow re-use of the one virtual network address by updating the mapping table to assign the one virtual network address to different ones of the two or more physical ports and to further ones of the plurality of switches of further data planes.

16. The system of claim 13, wherein the SM is further to:
provide the configuration information to a first switch of the plurality of switches to identify the one virtual network address and a first one of the two or more physical ports on at least one host machine; and
provide second configuration information to a second switch of the plurality of switches to identify the one virtual network address and a second one of the two or more physical ports on the at least one host machine.

17. The system of claim 13, wherein the SM is further to:
determine that a first number of physical ports on connected host machines in a network exceed a second number associated with available virtual network addresses;
prepare the different data planes for an assignment; and
enable the available virtual network addresses to be assigned, as part of the assignment, to the first number of physical ports based at least on the different data planes available in the network.

18. A method for addressing in a network, the method comprising:
providing, in a subnet manager (SM), a mapping table of one virtual network address assigned to two or more physical ports;
enabling the one virtual network address to be associated with different switches of different data planes; and
communicating, concurrently and separately, data associated with the two or more physical ports using the one virtual network address and using the two or more physical ports.

19. The method of claim 18, wherein the different data planes provide physical separation for traffic associated with the two or more physical ports.

20. The method of claim 18, further comprising:
determining connected devices in the network;
determining that the one virtual network address is associated with a first physical port of the two or more physical ports on a host machine and is associated with a first one of the different switches; and
assigning the one virtual network address to a second physical port of the two or more physical ports on the host machine and to a second one of the different switches.

* * * * *